United States Patent
Cornwell et al.

(10) Patent No.: US 10,703,656 B2
(45) Date of Patent: Jul. 7, 2020

(54) WATER IONIZATION SYSTEM AND METHOD

(71) Applicant: Pentair Filtration Solutions, LLC, Hanover Park, IL (US)

(72) Inventors: James Cornwell, Oakdale, MN (US); Zack Schmidt, Oakdale, MN (US); John Krueger, Minneapolis, MN (US); Brian Sheehan, Minneapolis, MN (US)

(73) Assignee: Pentair Filtration Solutions, LLC, Hanover Park, IL (US)

( * ) Notice: Subject to any disclaimer, the term of this patent is extended or adjusted under 35 U.S.C. 154(b) by 226 days.

(21) Appl. No.: 15/593,065

(22) Filed: May 11, 2017

(65) Prior Publication Data
US 2017/0327393 A1    Nov. 16, 2017

Related U.S. Application Data

(60) Provisional application No. 62/334,812, filed on May 11, 2016.

(51) Int. Cl.
| | | |
|---|---|---|
| *C02F 1/68* | (2006.01) | |
| *C12C 5/00* | (2006.01) | |
| *A23F 5/26* | (2006.01) | |
| *A23L 2/52* | (2006.01) | |

(52) U.S. Cl.
CPC ............. *C02F 1/688* (2013.01); *A23F 5/267* (2013.01); *A23L 2/52* (2013.01); *C12C 5/002* (2013.01); *A23V 2002/00* (2013.01); *C02F 2201/005* (2013.01); *C02F 2305/00* (2013.01); *C02F 2307/10* (2013.01)

(58) Field of Classification Search
None
See application file for complete search history.

(56) References Cited

U.S. PATENT DOCUMENTS

| | | |
|---|---|---|
| 2003/0234212 A1 | 12/2003 | Ito et al. |
| 2005/0263457 A1 | 12/2005 | Wilkins et al. |
| 2009/0011088 A1 | 1/2009 | Beeman et al. |
| 2011/0014722 A1* | 1/2011 | Sakowski ........... B01L 3/50255 436/178 |
| 2011/0163016 A1 | 7/2011 | Saveliev et al. |

(Continued)

FOREIGN PATENT DOCUMENTS

WO      2015091566 A1    6/2015

OTHER PUBLICATIONS

Kratochuil: Selective sulfate removal from hard wastewater . . . ; Abstracted—Pub-No. WO 2009039655 A1; pub. Date: Apr. 2, 2009 (Year: 2009).*

(Continued)

*Primary Examiner* — Patricia A George
(74) *Attorney, Agent, or Firm* — Husch Blackwell LLP

(57) ABSTRACT

A method for producing an ionized water product for coffee comprises the steps of introducing source water to an ionization system, passing the source water through one or more reaction vessels, wherein one or more ionic species are introduced into the source water, and combining products of one or more reaction vessels to produce the ionized water product having between about 10 ppm to about 40 ppm magnesium ions, about 10 ppm to about 40 ppm calcium ions, and about 40 ppm to about 90 ppm total of bicarbonate and carbonate ions.

20 Claims, 2 Drawing Sheets

(56) References Cited

U.S. PATENT DOCUMENTS

2012/0255623 A1* 10/2012 Bell .......................... C02F 1/50
137/268
2013/0164411 A1 6/2013 Skobvy et al.
2016/0377067 A1 12/2016 Saveliev et al.

OTHER PUBLICATIONS

Reinsel: Sulfate Removal Technologies: A Review; published Jan. 6, 2015 in Water online. at: https://www.wateronline.com/doc/sulfate-removal-technologies-a-review-0001 (Year: 2015).*
Kawamura: Method for Adjusting Liquid Composition ; Pat. No. JP362097693A; published: May 7, 1987. (Year: 1987).*
IDPH: Illinois Department of Public Health: Commonly found substances in drinking water; published online at least by Sep. 16, 2002 at http://web.archive.Org/web/20020916123901/http://www.idph.state.il.us/envhealth/pdf/DrinkingWater.pdf, (Year: 2002).*
Azoulay: Comparison of mineral content of tap water and bottled water; Journal Gen Intern Med 2001; vol. 16:168-165; Mar. 2001 . (Year: 2001).*
Chemindustry: Batching Systems; published online at least by Aug. 10, 2003 at: https://web.archive.org/web/20030810103740/https://www.chemindustrial.com/products/batching_systems.htm (Year: 2003).*
International Search Report and Written Opinion for PCT/US2017032227; dated Aug. 29, 2017; 14 pages.
Water for Coffee; Corrigendum Oct. 10, 2015; Maxwell Colonna—Dashwood Christopher H. Hendon; retrieved from the internet; 15 pages.

* cited by examiner

WATER IONIZATION SYSTEM AND METHOD

CROSS REFERENCE TO RELATED APPLICATIONS

The present application claims the benefit of U.S. Provisional Application Ser. No. 62/334,812, filed on May 11, 2016, and entitled "Water Ionization System and Method." The content of such provisional application is hereby incorporated by reference in its entirety.

BACKGROUND

In any beverage making process that relies on extraction of flavor ingredients (i.e. coffee beans, tea leaves, malt, hops, etc.), the types and concentrations of ionic species present in water used for extraction impact the flavor and taste of the water, and the beverage product produced from the water. A specific example is coffee or espresso brewing where calcium and magnesium ions are used for extracting desirable compounds from the coffee bean. However, the overall flavor of the water and coffee becomes "chalky," if the calcium and magnesium ions are present in too high of a concentration.

Similarly, alkalinity is defined as the capacity of an aqueous solution to neutralize an acid. Many of the extracted ingredients in beverages such as coffee and beer brewing are organic acids, and therefore will react with alkaline species in the water, which may negatively alter the flavor profile. In order to maintain a uniform flavor in these beverage making processes, it is useful to control the alkalinity of the ingredient water.

SUMMARY

Some embodiments provide a water ionization apparatus comprising an inlet, one or more reaction vessels, one or more valves, and one or more dosing mechanisms.

Some embodiments provide a method for producing an ionized water product comprising the steps of introducing source water into an ionization system, passing the source water through one or more reaction vessels, introducing one or more ionic species into the source water, and combining products of one or more reaction vessels to achieve a desired composition of ions in the ionized water product.

Some embodiments provide an ionized water product comprising between about 10 ppm to about 40 ppm magnesium ions, between about 10 ppm to about 40 ppm calcium ions, and between about 40 ppm to about 90 ppm bicarbonate and/or carbonate ions.

In an exemplary embodiment, a method for producing ionized water product for coffee comprises the steps of introducing source water to an ionization system, passing the source water through one or more reaction vessels, wherein one or more ionic species are introduced into the source water, and combining products of one or more reaction vessels to produce the ionized water product having between about 10 ppm to about 40 ppm magnesium ions, about 10 ppm to about 40 ppm calcium ions, and about 40 ppm to about 90 ppm total of bicarbonate and carbonate ions.

In some embodiments, the method further includes the step of passing the source water through a first valve that directs the source water into first and second streams.

In some embodiments, the method further includes the steps of passing the first stream through a first reaction vessel and passing the second stream through a second reaction vessel.

In some embodiments, the first reaction vessel comprises a packed bed of solid, calcium carbonate configured to dissolve calcium and carbonate ions into the source water.

In some embodiments, the second reaction vessel comprises a packed bed of solid magnesium sulfate configured to dissolve magnesium and sulfate ions into the source water.

In some embodiments, the method further includes the steps of passing an output of the second vessel through a second valve, which directs an output of the second vessel to a second valve and directing a first portion of the output from the second vessel to a third vessel.

In some embodiments, the method further includes the step of directing a second portion of the output from the second vessel to a first dosing mechanism.

In some embodiments, the output of the second vessel comprises a saturated magnesium sulfate stream and the method further includes the step of replacing sulfate ions from the saturated magnesium sulfate stream with bicarbonate ions utilizing a strongly basic anion exchange resin to create a magnesium bicarbonate solution.

In some embodiments, the method further includes the step of directing an output of the third vessel to a second dosing mechanism.

In some embodiments, the method further includes the step of creating a final ionized water product by combining a first ionized water stream from the first vessel, a second ionized water stream from the first dosing mechanism, and a third ionized water stream from the second dosing mechanism.

In some embodiments, the first ionized water stream comprises calcium carbonate solution, the second ionized water stream comprises saturated magnesium sulfate solution, and the third ionized water stream comprises magnesium biocarbonate solution.

In some embodiments, the first, second, and third ionized water streams are mixed in a controlled manner by the first and second dosing mechanisms to produce an ionized ingredient water stream.

In some embodiments, the method further includes a controller in communication with the first and second valves, the first, second, and third reaction vessels, and the first and second dosing mechanisms to control operation of the first and second valves, the first, second, and third reaction vessels, and the first and second dosing mechanisms.

In other exemplary embodiments, a method for producing an ionized water product for coffee comprises the steps of introducing source water to an ionization system, passing a first portion of the source water through a first reaction vessel comprising a packed bed of solid calcium carbonate configured to dissolve calcium and carbonate ions into the source water to create a first ionized water stream, passing a second portion of the source water through a second reaction vessel comprising a packed bed of solid magnesium sulfate configured to dissolve magnesium and sulfate ions into the source water, separating a saturated magnesium sulfate output stream of the second reaction vessel into a first stream that is passed to a first dosing mechanism that creates a second ionized water stream and a second stream that is passed to a third reaction vessel, passing second stream through the third reaction vessel, wherein the contents of the third vessel replace sulfate ions from the saturated magnesium sulfate output stream with bicarbonate ions utilizing a strongly basic anion exchange resin to create a magnesium bicarbonate solution, passing an output of the third vessel to a dosing mechanism that creates a third ionized water stream, and combining the first, second, and third ionized water streams to produce an ionized ingredient water stream.

In other exemplary embodiments, a system for producing an ionized water product for coffee comprises a first fluid line carrying source water from a water supply, a first valve configured to split the source water into first and second streams, a first reaction vessel receiving the first stream, the first reaction vessel comprising a first ionic species to be introduced to the first stream, a second reaction vessel receiving the second stream, the second reaction vessel comprising a second ionic species to be introduced to the second stream, and a dosing mechanism receiving a third stream from the second reaction vessel and configured to provide a metered amount of fluid from the second reaction vessel, wherein the first and second ionic species are different.

In some embodiments, the system includes a controller for controlling mixing of a first output from the first reaction vessel and a second output from the dosing mechanism.

In some embodiments, the system includes a third reaction vessel receiving a fourth stream from the second reaction vessel, the third reaction vessel comprising a third ionic species to be introduced to the fourth stream and a second dosing mechanism receiving the fourth stream from the third reaction vessel and configured to provide a metered amount of fluid from the third reaction vessel, wherein the controller controls mixing of the first output from the first reaction vessel, the second output from the dosing mechanism, and a third output from the second dosing mechanism and wherein the first, second, and third ionic species are different.

In some embodiments, the system includes a second valve configured to split an output from the second reaction vessel into the third and fourth streams.

In some embodiments, the first ionic species comprises calcium carbonate, the second ionic species comprises magnesium sulfate, and the third ionic species comprises bicarbonate ion.

In some embodiments, the controller is in communication with the first and second valves, the first and second dosing mechanisms, and the first, second, and third reaction vessels to control operation and an output of the system.

DETAILED DESCRIPTION

Figure 1:
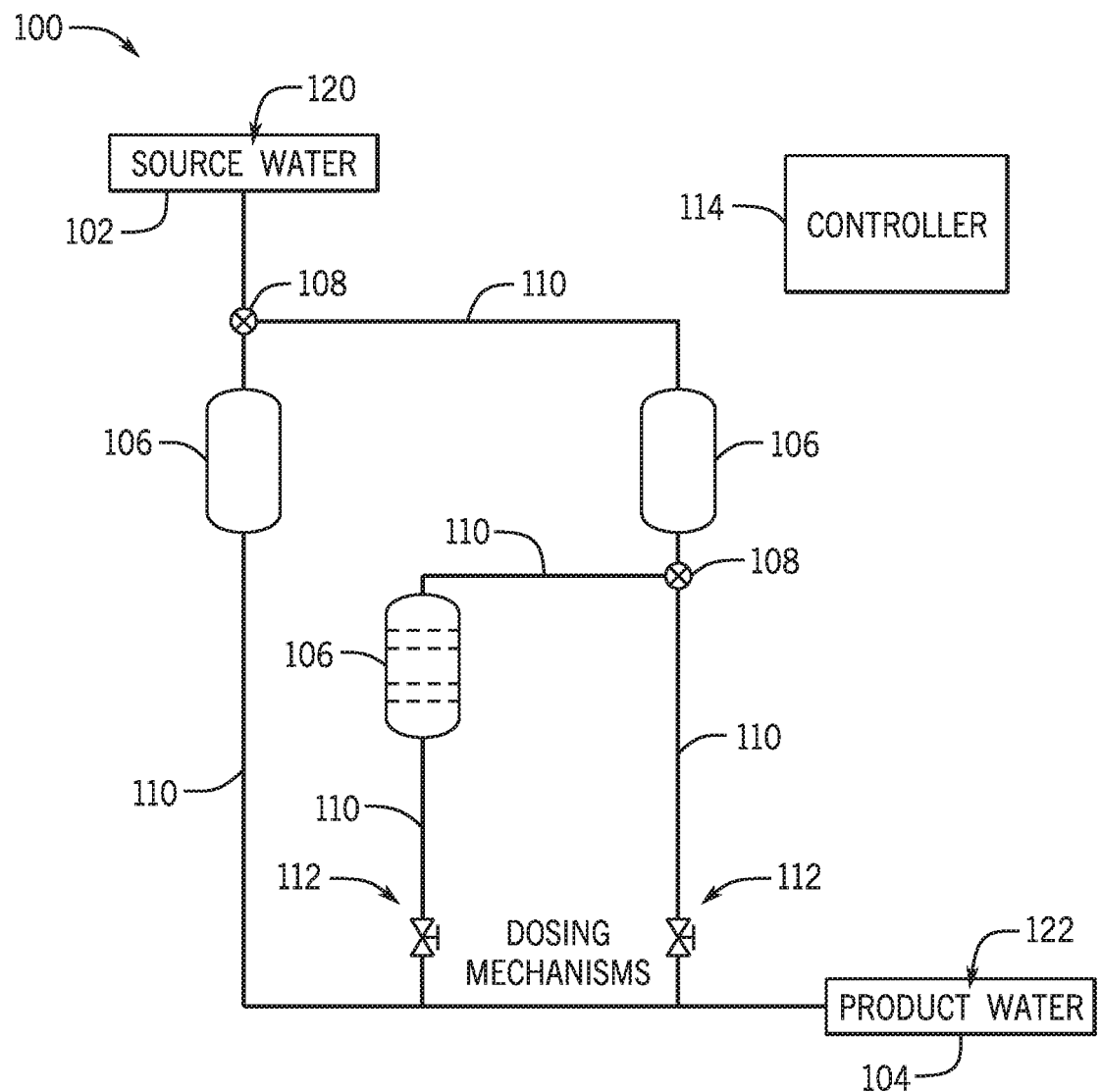
FIG. 1 is a schematic view of a water ionization system according to one embodiment.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates a beverage water ionization system 100 designed to produce water utilized in the production of a beverage for human consumption. The water ionization system 100 can include an inlet 102, an outlet 104, one or more reaction vessels 106, one or more valves 108, one or more conduits or fluid lines 110, one or more dosing mechanisms 112, and a controller 114.

The inlet 102 is designed to permit source water 120 to enter the water ionization system 100. In some instances, the source water 120 of the present system may not be ideal ingredient water for beverage making. In one embodiment, the source water 120 may be naturally low in hardness and alkalinity or have been treated such that the hardness level is less than or equal to about 40 mg/L and/or the alkalinity level is less than or equal to about 40 mg/L. The inlet 102 may be connected to a local water supply such that the source water 120 is provided directly from a local water utility. The inlet 102 may be any type of pipe, pipefitting, valve, conduit, tap, spigot or other means by which water can be introduced into the system 100. In some embodiments, the inlet 102 may be connected to a water filtration system, such that the source water 120 is filtered water.

The outlet 104 is designed to permit product water 122 to leave the water ionization system 100 after it has passed through one or more reaction vessels 106. The outlet 104 may be connected to a distribution hub such that the product water 122 can be used in any number of applications. In some embodiments, the outlet 104 is connected to a means of beverage production or a beverage making process, such as brewing coffee or espresso. In some embodiments, the outlet 104 may be connected to a secondary means for further processing of the product water stream 122. The outlet 104 may be any type of pipe, pipefitting, valve, conduit, tap, spigot or other means by which water can exit the system 100.

The water ionization system 100 further includes one or more reaction vessels 106. The reaction vessels 106 are designed to add various ionic species to the source water 120. The reaction vessels 106 maybe made of glass, plastic, metal, rubber, polycarbonate, or combinations thereof. The reaction vessels 106 may include, but are not limited to, ion exchange columns, solid resin beds for dissolution, and/or combinations thereof. In some embodiments, the reaction vessel 106 contains a solid packed resin bed containing the chemical of choice to be dissolved in the source water 120. A variety of chemicals can be used to achieve ionization of the source water 120 within the reaction vessels 106, including, but not limited to, calcium carbonate, calcium sulfate, magnesium carbonate, magnesium sulfate, or mixtures there of.

In one embodiment, the reaction vessel 106 includes an ion exchange resin provided in an ion exchange column that is a strongly or weakly basic anion exchange resin for the introduction of alkaline species into the source water 120. In some embodiments of the reaction vessel 106, the ion exchange resin is a strongly or weakly acidic cation resin for the introduction of mineral species into the source water 120. In some embodiments, the reaction vessel 106 may contain a mixed resin bed for both anion and cation exchange. The ion exchange resin may be any known porous insoluble matrix known in the art, including but not limited to silica and organic polymers, such as polystyrene. The ion exchange resin may be charged with a variety of known ionic species in an aqueous state suitable for ionic exchange within the reaction vessel 106.

It is envisioned that the system may have any number of reaction vessels 106 in many different combinations. The reaction vessels 106 may be connected in series, or the reaction vessels 106 may be connected in a branched configuration as part of divergent flow paths within the system, such that source water is separately treated in different reaction vessels 106 before being recombined using a dosing mechanism 112 or other mixing mechanism.

In one embodiment, the water ionization system 100 may be contained within one housing body or cover (not shown). In another embodiment, the water ionization system 100 may contain separate housing bodies for each reaction vessel 106. In another embodiment, multiple reaction vessels 106 of the system 100 may be housed together in one housing body or containment system while other reaction vessels are housed separately.

The flow path of the source water 120 through the reaction vessels 106 is directed by one or more valves 108. The valves 108 may include, but are not limited to, flow control valves, fixed orifices, venture meters, metering pumps, and micro-dosers.

Fluid lines 110 connect the inlet 102 with the valves 108 and the reaction vessels 106. The fluid lines may include, but are not limited to, tubes, pipes, conduits, and/or any other structure(s) to convey a fluid. The fluid lines 110 also connect the reaction vessels 106 with the dosing mechanisms 112 and outlet 104.

The water ionization system 100 further includes one or more dosing mechanisms 112. The dosing mechanisms 112 are designed to blend together the product streams from the reaction vessels 106 to achieve the proper ionic ratios in the product water 122. The dosing mechanisms 112 may include, but are not limited to, flow control valves, blend valves, fixed orifices, venture meters, metering pumps, piston valves and micro-dosers. In some embodiments, the doser described in U.S. Patent Application No. 62/186,265, filed on Jun. 29, 2015, and incorporated by reference in its entirety, may be used.

The dosing mechanisms 112 can be controlled manually or automatically to achieve a desired composition of ions in the product water 122. In one embodiment, the dosing mechanism 112 is manually adjusted at system installation for the desired blending of ionized water streams from each reaction vessel 106. In another embodiment, the dosing mechanism 112 is controlled by a controller 114, such that the desired composition of ions in the product water 122 can be adjusted. In another embodiment, the system 100 is equipped with sensors (not shown) to automatically adjust the dosing mechanisms 112 to achieve the desired composition of ions in the product water 122.

In one embodiment, the water ionization system 100 is in communication with and controlled by a controller 114, which may be housed with or independently from the ionization system 100. The controller 114 may be a microprocessor in communication with a computer by which the flow of the source water 120 through the system 100 may be controlled. The controller 114 may be in communication with one or more valves 108, reaction vessels 106, and/or dosing mechanisms 112 to control and monitor each stage of the water ionization system 100. The controller may also regulate the properties of the product water 122 by controlling the input of each dosing mechanisms 112.

The following example illustrates use of the water ionization system 100 as described above.

Example No. 1

Figure 2:
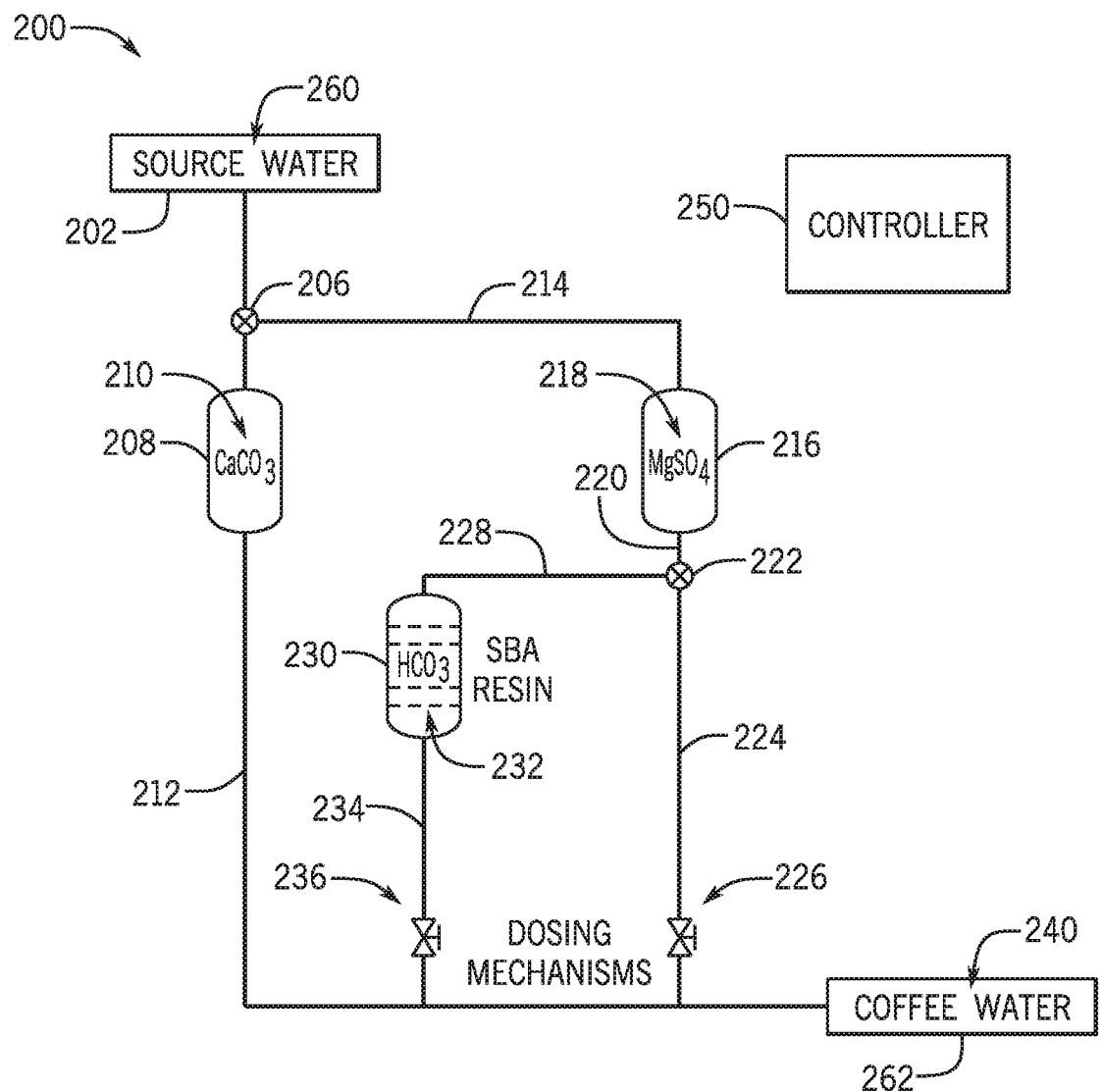
FIG. 2 is a schematic view of an example water ionization system according to one embodiment.

An example system is depicted in FIG. 2. A water ionization system 200 is made up of three distinct chemical reactions to ionize source water 260 for use in beverage making. In one embodiment, this example is for use in the preparation of water for coffee brewing.

An inlet 202 is designed to permit source water 260 to enter the water ionization system 200. A fluid line 204 carries the source water 260 to a first valve 206 that is designed to distribute the source water 260 to a first reaction vessel 208 and a second reaction vessel 216 through a fluid lines 211 and 214, respectively.

The source water 260 enters the first reaction vessel 208 after being directed through the first valve 206. In this example, the first reaction vessel 208 is provided as a solid bed of calcium carbonate ($CaCO_3$) 210. The first reaction vessel 208 is designed for the ionic species calcium, $Ca^{2+}$, and carbonate, $CO_3^{2-}$, to be dissolved into the source water 260 from the solid bed of calcium carbonate 210. The calcium carbonate saturated source water leaves the first reaction vessel 208 through a fluid line 212.

The source water 260 enters the second reaction vessel 216 from the fluid line 214 after being directed through the first valve 206. In this example, the second reaction vessel 216 is provided as a solid bed of magnesium sulfate 218. The second reaction vessel 216 is designed for the ionic species magnesium, $Mg^{2+}$, and sulfate, $SO_4^{2-}$, to be dissolved into the source water 260 from the solid bed of magnesium sulfate ($MgSO_4$) 218. The magnesium sulfate saturate source water leaves the second reaction vessel 216 through a fluid line 220 to be distributed through a second valve 222. A portion of the ionized source water is distributed through the second valve 222 to a fluid line 224 and a first dosing mechanism 226. Additionally, a portion of the ionized source water can be distributed through the second valve 222 to a third reaction vessel 230 through a fluid line 228.

The saturated magnesium sulfate stream enters the third reaction vessel 230 from the fluid line 228 after being directed through the second valve 222. In this example, the third reaction vessel 230 is provided as a strongly basic anion (SBA) exchange resin 232 preloaded with bicarbonate ion, $HCO_3^-$. The third reaction vessel 230 is designed as an ion exchange column such that sulfate ions, $SO_4^{2-}$, will exchange with bicarbonate ions, $HCO_3^-$. The product stream from the third reaction vessel 230, containing bicarbonate and magnesium ions, passes through a fluid line 234 to a second dosing mechanism 236.

The products of the third reaction vessel 230, containing bicarbonate and magnesium, and the second reaction vessel 216, containing magnesium sulfate, are mixed with the calcium carbonate saturated product of the first reaction vessel 208. The ionized water stream from the third reaction vessel 230 passes through the second dosing mechanism 236, while the ionized water stream from the second reaction vessel 216 passes through the first dosing mechanism 226.

The final ionized water product 262 leaves the system 200 through an outlet 240. The system 200 is designed to produce an ionized water product to be used as ingredient water for the brewing of coffee and espresso. It is also envisioned that other embodiments of this example can be configured to produce an ionized water product to be used as ingredient water for other beverage applications.

In a method for producing ionized water for beverage production, source water 260 is passed through three separate reaction vessels 208, 216, and 230 to introduce various dissolved ionic species into the source water 260. The source water 260 is introduced into the system 200 through the inlet 202. The flow path of the source water 260 is directed by the first valve 206 into two streams; a first stream to the first reaction vessel 208 and a second stream through the fluid line 214 to the second reaction vessel 216.

A saturated calcium carbonate solution is created by passing a water stream over a packed resin bed. In the first reaction vessel 208, the first stream of source water 260 is passed through a packed bed of solid calcium carbonate 210 to dissolve calcium ($Ca^{2+}$) and carbonate ($CO_3^{2-}$) ions into the source water 260. The calcium carbonate saturated solution exits the first reaction vessel 208 through the fluid line 212.

A saturated magnesium sulfate solution is created by passing a water stream over a packed resin bed. In the second reaction vessel 216, the second stream source water 260 is passed through a packed bed of solid magnesium sulfate 218 to dissolve magnesium ($Mg^{2+}$) and sulfate ($SO_4^{2-}$) ions into the source water 260. The magnesium sulfate saturated solution exits the second reaction vessel 216 through the fluid line 212. A branched flow path is controlled by the second valve 222, which directs the magnesium sulfate saturated solution to the first dosing mechanism 226 or into a third stream to the third reaction vessel 230 through the fluid line 228.

A magnesium bicarbonate solution is created by an ion exchange reaction in which the sulfate ions from the saturated magnesium sulfate stream are replaced with bicarbonate ions. In the third ion exchange reaction vessel 230, the sulfate ions of the third stream are exchanged for biocarbonate ions ($HCO_3^-$) by the strongly basic anion exchange resin 232. The resulting magnesium biocarbonate ionized water stream exits the third ion exchange reaction vessel 230 by the fluid line 234 to the second dosing mechanism 236.

A final ionized water product 262 is created by combining the saturated calcium carbonate, magnesium sulfate, and magnesium bicarbonate solutions by mixing with one or more dosing mechanisms. The first, second, and third ionized water streams from the reaction vessels 208, 216, and 230 are mixed in a controlled manner by the dosing mechanisms 226 and 236 to produce an ionized ingredient water stream with a desired composition of ions. The desired composition of ions can be controlled by the mixing various ratios of the products from the three reaction vessels, and may optionally be controlled by the controller 250. The desired composition of ions will vary based on the desired beverage application for which the ionized water product is used.

A liquid produced by the system described herein will have properties in accordance with the desired composition of ions in water for the beverage application in which it is used. The properties of the ionized product water 122 are determined by the particular composition of the reaction vessels 106 of the system 100 and subsequent mixing via the dosing mechanisms 112. Different beverage chemistry applications utilize different water compositions, which can be achieved by various combinations of reaction vessels 106 and dosing mechanism configurations of the system and may be controlled by the controller 114. The following embodiments demonstrate various ion concentrations in various beverage chemistry applications.

The range of magnesium ion ($Mg^{2+}$) concentrations in various beverage chemistry applications may be between about 0 ppm to about 300 parts per million (ppm). In one embodiment, the magnesium ion concentration in an ionized water product may be between about 0 ppm to about 60 ppm. In another embodiment, the magnesium ion concentration in the ionized water product may be between about 10 ppm to about 40 ppm.

The range of calcium ion ($Ca^{2+}$) concentrations in various beverage chemistry applications may be between about 0 ppm to about 300 ppm. In one embodiment, the calcium ion concentration in the ionized water product may be between about 0 ppm to about 60 ppm. In another embodiment, the calcium ion concentration in the ionized water product may be between about 10 ppm to about 40 ppm.

The range of bicarbonate ($HCO_3^-$) and carbonate ($CO_3^{2-}$) ion concentrations in various beverage chemistry applications may be between about 0 ppm to about 300 ppm. In one embodiment, the bicarbonate and carbonate ion concentration in the ionized water product may be between about 50 ppm to about 100 ppm. In another embodiment, the bicarbonate and carbonate ion concentration in the ionized water product may be between about 40 ppm to about 90 ppm.

The range of sulfate ion ($SO_4^{2-}$) concentrations in various beverage chemistry applications may be between about 0 ppm to about 300 ppm.

In one specific example, a beverage concentration for water used in coffee beverages may include a magnesium ion concentration between about 10 ppm to about 40 ppm, a calcium ion concentration between about 10 ppm to about 40 ppm, and a bicarbonate and carbonate ion concentration between about 40 ppm to about 90 ppm.

The ionized water product produced by the system described herein will have applications including ingredient water for brewing coffee, espresso, beer, tea, and other beverage making applications including but not limited to soda, juice, energy drinks, or bottled water.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A method for producing an ionized water product for coffee, the method comprising:
   introducing source water to an ionization system;
   passing the source water through a first valve that directs the source water into first and second streams;
   passing the first stream through a first reaction vessel;
   passing the second stream through a second reaction vessel;
   passing an output of the second reaction vessel through a second valve, which directs the output of the second vessel into a first portion and a second portion;
   directing the first portion of the output from the second reaction vessel to a third reaction vessel;
   directing the second portion of the output from the second reaction vessel to a first dosing mechanism that regulates the flow of the second portion;
   directing an output of the third reaction vessel to a second dosing mechanism that regulates a flow of the output of the third reaction vessel;
   creating the ionized water product by combining a first ionized water stream from the first reaction vessel, a second ionized water stream from the first dosing mechanism, and a third ionized water stream from a second dosing mechanism via a controller configured to automatically adjust ratios of the products to produce the ionized water product having between about 10 ppm to about 40 ppm magnesium ions, about 10 ppm to about 40 ppm calcium ions, and about 40 ppm to about 90 ppm total of bicarbonate and carbonate ions; and
   making coffee with the ionized water.

2. The method of claim 1, wherein the first reaction vessel comprises a packed bed of solid calcium carbonate to dissolve calcium and carbonate ions into the source water.

3. The method of claim 1, wherein the second reaction vessel comprises a packed bed of solid magnesium sulfate to dissolve magnesium and sulfate ions into the source water.

4. The method of claim 1, wherein the output of the second reaction vessel comprises a saturated magnesium sulfate stream and the method further comprises replacing sulfate ions from the saturated magnesium sulfate stream with bicarbonate ions utilizing a strongly basic anion exchange resin to create a magnesium bicarbonate solution.

5. The method of claim 1, wherein the first ionized water stream comprises calcium carbonate solution, the second ionized water stream comprises saturated magnesium sulfate solution, and the third ionized water stream comprises magnesium bicarbonate solution.

6. The method of claim 5, wherein the first, second, and third ionized water streams are mixed in a controlled manner by the first and second dosing mechanisms to produce an ionized ingredient water stream.

7. The method of claim 6, wherein the controller is in communication with the first and second valves, the first, second, and third reaction vessels, and the first and second dosing mechanisms to control operation of the first and second valves, the first, second, and third reaction vessels, and the first and second dosing mechanisms.

8. A method for producing an ionized water product for coffee, comprising the steps of:
   introducing source water into an ionization system;
   passing the source water through a first valve that directs the source water into first and second streams;
   passing the first stream through a first reaction vessel comprising a packed bed of solid calcium carbonate configured to dissolve calcium and carbonate ions into the source water to create a first ionized water stream;
   passing the second stream through a second reaction vessel comprising a packed bed of solid magnesium sulfate configured to dissolve magnesium and sulfate ions into the source water;
   passing a saturated magnesium sulfate output stream of the second reaction vessel through a second valve, which directs the output of the second vessel into a first portion and a second portion;
   directing the first portion of the output from the second reaction vessel to a third reaction vessel, wherein the contents of the third vessel replace sulfate ions from the saturated magnesium sulfate output stream with bicarbonate ions utilizing a strongly basic anion exchange resin to create a magnesium bicarbonate solution;
   directing the second portion of the output from the second reaction vessel to a first dosing mechanism that regulates a flow of the second portion;
   passing an output of the third vessel to a second dosing mechanism that regulates a flow of the output of the third reaction vessel;
   creating the ionized water product by combining the first ionized water stream from the first reaction vessel, the second ionized water stream from the first dosing mechanism, and the third ionized water stream From the second dosing mechanism to produce an ionized ingredient water stream having between about 10 ppm to about 40 ppm magnesium ions, about 10 ppm to about 40 ppm calcium ions, and about 40 ppm to about 90 ppm total bicarbonate and carbonate ions;
   making coffee with the ionized water.

9. A method for producing an ionized water product for coffee, the method comprising:
   introducing source water to an ionization system;
   passing the source water through one or more reaction vessels, wherein one or more ionic species are introduced into the source water, including passing the source water through a first valve that directs the source water into first and second streams, passing the first stream through a first reaction vessel of the one or more reaction vessels, passing the second stream through a second reaction vessel of the one or more reaction vessels;
   passing an output of the second reaction vessel through a second valve, which directs the output of the second reaction vessel into a first portion and a second portion, directing the first portion of the output from the second reaction vessel to a third reaction vessel, directing the second portion of the output from the second reaction vessel to a first dosing mechanism that regulates a flow of the second portion, and directing an output of the third reaction vessel to a second dosing mechanism that regulates the flow of the output of the third reaction vessel;
   combining products of the reaction vessels via a controller configured to automatically adjust ratios of the products to produce the ionized water product having between about 10 ppm to about 40 ppm magnesium ions, about 10 ppm to about 40 ppm calcium ions, and about 40 ppm to about 90 ppm total of bicarbonate and carbonate ions, including, combining a first ionized water stream from the First reaction vessel, a second ionized water stream from the first dosing mechanism, and a third ionized water stream from the second dosing mechanism; and
   making coffee with the ionized water.

10. The method of claim 9, wherein the first ionized water stream comprises calcium carbonate solution, the second ionized water stream comprises saturated magnesium sulfate solution, and the third ionized water stream comprises bicarbonate solution.

11. The method of claim 9, wherein the first, second, and third ionized water streams are mixed in a controlled manner by the first and second dosing mechanisms to produce an ionized ingredient water stream.

12. The method of claim 9, wherein the controller is in communication with the first and second valves, the first, second, and third reaction vessels, and the first and second dosing mechanisms to control operation of the first and second valves, the first, second, and third reaction vessels, and the first and second dosing mechanisms.

13. The method of claim 9, wherein the source water has an alkalinity level less than or equal to about 40 mg/L.

14. The method of claim 9, wherein the steps of passing the source water through a first valve that directs the source water into first and second stream, passing the first stream through a first reaction vessel, passing the second stream through a second reaction vessel, passing an output of the second reaction vessel through a second valve which directs the output of the second vessel into a first portion and a second portion, and directing the first portion of the output from the second reaction vessel to a third reaction vessel each occur within on housing body.

15. The method of claim 1, wherein the third reaction vessel comprises a strongly basic anion (SBA) exchange resin preloaded with bicarbonate ion.

16. The method of claim 1, wherein the controller is operatively coupled with at least one sensor to automatically adjust the first and second dosing mechanisms.

17. The method of claim 1, wherein the source water has an alkalinity level less than or equal to about 40 mg/L.

18. The method of claim 1, wherein the first, second and third reaction vessels each comprise an ion exchange resin that is a strongly or weakly basic anion exchange resin for the introduction of alkaline species into the source water.

19. The method of claim 1, wherein the steps of passing the source water through a first valve that directs the source water into first and second stream, passing the first stream through a first reaction vessel, passing the second stream through a second reaction vessel, passing an output of the second reaction vessel through a second valve which directs the output of the second vessel into a first portion and a second portion, and directing the first portion of the output from the second reaction vessel to a third reaction vessel each occur within on housing body.

20. The method of claim 8, wherein the step of creating the ionized water product by combining the first ionized water stream from the first reaction vessel, the second ionized water stream from the first dosing mechanism, and the third ionized water stream from the second dosing mechanism to produce an ionized ingredient water stream having between about 10 ppm to about 40 ppm magnesium ions, about 10 ppm to about 40 ppm calcium ions, and about 40 ppm to about 90 ppm total bicarbonate and carbonate ions comprises creating the ionized water product by combining the first ionized water stream from the first reaction vessel, the second ionized water stream from the first dosing mechanism, and the third ionized water stream from the second dosing mechanism via a controller to produce the ionized ingredient water stream.

* * * * *